(12) United States Patent
Desantes Fernández et al.

(10) Patent No.: US 10,379,002 B2
(45) Date of Patent: Aug. 13, 2019

(54) DEVICE FOR ATMOSPHERE CONDITIONING FOR TESTING COMBUSTION ENGINES, AND ASSOCIATED METHOD AND USE

(71) Applicant: UNIVERSIDAD POLITÉCNICA DE VALENCIA, Valencia (ES)

(72) Inventors: José María Desantes Fernández, Valencia (ES); José Galindo Lucas, Valencia (ES); Francisco Payri González, Valencia (ES); Pedro Piqueras Cabrera, Valencia (ES); José Ramón Serrano Cruz, Valencia (ES)

(73) Assignee: UNIVERSITAT POLITÉCNICA DE VALENCIA, Valencia (ES)

( * ) Notice: Subject to any disclaimer, the term of this patent is extended or adjusted under 35 U.S.C. 154(b) by 464 days.

(21) Appl. No.: 15/113,969

(22) PCT Filed: Jan. 21, 2015

(86) PCT No.: PCT/ES2015/070037
§ 371 (c)(1),
(2) Date: Jul. 25, 2016

(87) PCT Pub. No.: WO2015/110683
PCT Pub. Date: Jul. 30, 2015

(65) Prior Publication Data
US 2016/0349147 A1    Dec. 1, 2016

(30) Foreign Application Priority Data

Jan. 24, 2014  (ES) .................................. 201430071

(51) Int. Cl.
*G01M 15/02*  (2006.01)

(52) U.S. Cl.
CPC .................................. *G01M 15/02* (2013.01)

(58) Field of Classification Search
CPC ...................................................... G01M 15/02
(Continued)

(56) References Cited

U.S. PATENT DOCUMENTS

| 5,311,774 A | 5/1994 | Sava et al. |
| 5,628,203 A | 5/1997 | Adolph et al. |

(Continued)

FOREIGN PATENT DOCUMENTS

| CN | 101231215 A | 4/2010 |
| CN | 202547943 U | 11/2012 |

(Continued)

*Primary Examiner* — Walter L Lindsay, Jr.
*Assistant Examiner* — Philipmarcus T Fadul
(74) *Attorney, Agent, or Firm* — Wiggin and Dana LLP; Gregory S. Rosenblatt

(57) ABSTRACT

The invention relates to an atmosphere conditioning device for testing engines, comprising an inflow conduit connected to an engine admission, an outflow conduit connected to the exhaust of the engine and expelling exhaust gases, a communication conduit which communicates the inflow conduit with the outflow conduit, a supercharging turbogenerator comprising a turbine in the inflow conduit, a bypass valve which diverts the air flow that circulates towards the turbine, a heat regenerator consisting of heat exchangers in the inflow and outflow conduits, connected by the same heat transfer fluid circuit, a bypass valve in the outflow conduit together with the heat exchanger thereof, a heat exchanger in the outflow conduit downstream from the heat regenerator, and a turbocompressor downstream from the heat exchanger.

27 Claims, 4 Drawing Sheets

(58) Field of Classification Search
USPC .................................................. 73/114.01
See application file for complete search history.

(56) References Cited

U.S. PATENT DOCUMENTS

| | | |
|---|---|---|
| 2004/0186699 A1 | 9/2004 | Glinsky |
| 2010/0257924 A1 | 10/2010 | Stommel et al. |
| 2013/0295316 A1 | 11/2013 | Sueta et al. |
| 2013/0306159 A1 | 11/2013 | Payri Gonzalez et al. |

FOREIGN PATENT DOCUMENTS

| | | |
|---|---|---|
| DE | 29915931 U1 | 1/2000 |
| EP | 1600622 A2 | 11/2005 |
| EP | 2295950 A1 | 3/2011 |
| JP | 2006231974 A | 9/2006 |
| WO | 0242730 A2 | 5/2002 |
| WO | 2008036993 A2 | 7/2008 |

DEVICE FOR ATMOSPHERE CONDITIONING FOR TESTING COMBUSTION ENGINES, AND ASSOCIATED METHOD AND USE

TECHNICAL FIELD

The present invention generally relates to the field of testing combustion engines, and more specifically to a device for atmosphere conditioning when testing combustion engines.

PRIOR ART

Testing and characterizing reciprocating internal combustion engines in test benches require in many circumstances precise pressure and/or temperature control, both in the admission and in the exhaust. This is the case, for example, of testing campaigns intended for calibrating engine control with altitude, cold-starting studies, repeatability of reference conditions in testing campaigns extending over time, etc.

In many cases the problem raised is to obtain control over pressure so that it is less than atmospheric pressure, i.e., for simulating a high altitude situation. This case occurs, for example, when engine operation is to be studied at a level with a higher altitude than that of the laboratory in which testing is performed, or in the case of studying engines and aviation equipment. However, in other cases it is also desirable to reproduce low altitude conditions by increasing atmospheric pressure, for example when sea level conditions are to be reproduced in a testing room which is geographically located at a high altitude, or when engine behavior inside a mine below sea level is to be studied.

Some methods for performing such simulation of atmospheric conditions are already known in the art.

For example, patent document ES2398095 A1 (also published as US 20130306159 A1), belonging to the same applicants as the present patent document, discloses an installation for simulating the pressure and temperature conditions of the air drawn in by a reciprocating internal combustion engine operating at a height. Nevertheless, said installation has a series of drawbacks which would be desirable to solve to improve its performance.

The installation disclosed in patent document ES2398095 A1 is primarily dedicated to the study of high altitudes for the application thereof in aviation, but not to the study of the operation of the engines in low altitude conditions, as in the case of mines which are located below sea level. It would be desirable in this case to increase the equipment simulation range in order to simulate not only high level conditions but also low level conditions, in a reversible manner.

Said installation comprises, among others, a radial inward-flow turbine for expanding an air flow to the pressure and temperature of the air drawn in by the reciprocating internal combustion engine. Furthermore, the installation comprises a temperature conditioning system, which adjusts the desired temperature in the air after expansion in the radial inward-flow turbine, in a range of ±10° C. Precise control of radial inward-flow turbines is done with a standard PID by acting on the temperature conditioning system. Nevertheless, this arrangement of elements does not allow suitable simulation of certain conditions, such as high temperature.

In this case it would be desirable to improve the temperature control system in order to expand the equipment simulation range.

Patent document US2004186699 discloses a variable altitude simulator for testing engines, which both regulates the increase in pressure in admission and regulates the decrease thereof with respect to the testing site simulating altitudes that are higher and lower than the altitude of the testing site and regulates pressure and temperature independently of the air supplied to the engine.

Patent document WO2008036993 A2 discloses a method and device for supplying conditioned combustion gas to an internal combustion engine. The exhaust gases can be mixed with the air that is introduced in the intake of the engine. The internal combustion engine exhaust gases are discharged through an exhaust pipe by means of a suction system for the combustion engine exhaust gas, preferably a system including a filter, a diluting conduit and a fan.

Although some methods and devices are known for providing a simulation of atmospheric conditions at different altitudes for testing internal combustion engines, there is still a need in the art for alternative methods and devices providing advantages with respect to the prior art. For example, it would be desirable to have a device that allows atmosphere conditioning as regards pressure and temperature for testing combustion engines with lower energy expenditure. It would also be desirable to have a device that allows said pressure and temperature conditioning to be done independently from one another. In addition, it would be desirable to have a device that allows simulating atmospheric conditions at both high and low altitudes with a compact, easy and simple to use design, without requiring major changes in configuration to change the mode of operation.

DISCLOSURE OF THE INVENTION

The present invention discloses an atmosphere conditioning device for testing combustion engines providing at least one or several of the advantages described above. To that end, the device of the present invention comprises:

an inflow conduit arranged for being connected at a first end to a combustion engine admission to be subjected to testing and drawing in air from the outer atmosphere through a second end;

an outflow conduit arranged for being connected at a first end to the exhaust of the combustion engine and expelling exhaust gases into the atmosphere through a second end;

a first communication conduit which communicates the inflow conduit with the outflow conduit close to their respective first ends, such that the admission of the device is in communication with the exhaust thereof;

a supercharging turbogenerator arranged in the inflow conduit, the turbogenerator comprising a turbine coupled to a dissipation system for dissipating the energy generated in the expansion;

a bypass valve which diverts the air flow in the inflow conduit that circulates towards the turbine, the bypass valve and the turbine being able to be regulated to obtain desired flow rate and pressure values in the inflow conduit;

a first heat regenerator, consisting of respective heat exchangers in the inflow conduit and in the outflow conduit connected by the same heat transfer fluid circuit, arranged between the supercharging turbogenerator and the first communication conduit, facilitating indirect heat exchange between the exhaust gases in the outflow conduit and the admission air in the inflow conduit;

a bypass valve in the outflow conduit together with the corresponding heat exchanger of the first heat regenerator, regulating the amount of exhaust gases that actually participate in the heat exchange;

a heat exchanger in the outflow conduit downstream from the first heat regenerator to cool the exhaust gases to a safe temperature; and a turbocompressor downstream from the heat exchanger, charged by turbocompressor charging means, to regulate, together with the turbine and the bypass valve, the decrease in admission air pressure and the air flow.

Preferably, the operation of the device of the present invention can be inverted, by connecting the admission of the engine to the second end of the outflow conduit and the exhaust of the engine to the second end of the inflow conduit, the inflow conduit becoming the outflow conduit and vice versa, such that the turbocompressor, the turbine and the bypass valve together regulate the increase in admission air pressure.

Therefore, the device of the present invention allows modifying the pressure and temperature of the inflow air supplied to the engine to be subjected to testing independently. The device of the present invention also allows modifying the inflow air temperature with minimal energy expenditure by means of using the heat from the exhaust gases of the combustion engine to increase the inflow air temperature.

The present invention also discloses a method for atmosphere conditioning for testing combustion engines, comprising the steps of:

subjecting inflow atmospheric air to a pressure variation step;

subjecting inflow air to a temperature variation step;

diverting inflow air towards the outlet to directly communicate exhaust gases with inflow air;

introducing inflow air subjected to independent pressure and temperature variations in the admission of an engine to be subjected to testing;

reducing the temperature of the exhaust gases to a safe temperature for the passage thereof through a turbocompressor; and expelling exhaust gases from the engine subjected to testing into the atmosphere.

In the method of the invention, the inflow air pressure variation step is performed by means of the combined action of a turbocompressor, a turbine and a bypass valve regulating the amount of inflow air.

Finally, the present invention also relates to the use of a device according to the present invention for independently conditioning the pressure and temperature of the atmosphere while testing combustion engines.

BRIEF DESCRIPTION OF THE DRAWINGS

The present invention will be better understood in reference to the following drawings which illustrate preferred embodiments of the invention, provided by way of example, and which must not be interpreted as being limiting of the invention in anyway.

DETAILED DISCLOSURE OF THE INVENTION

Figure 1:
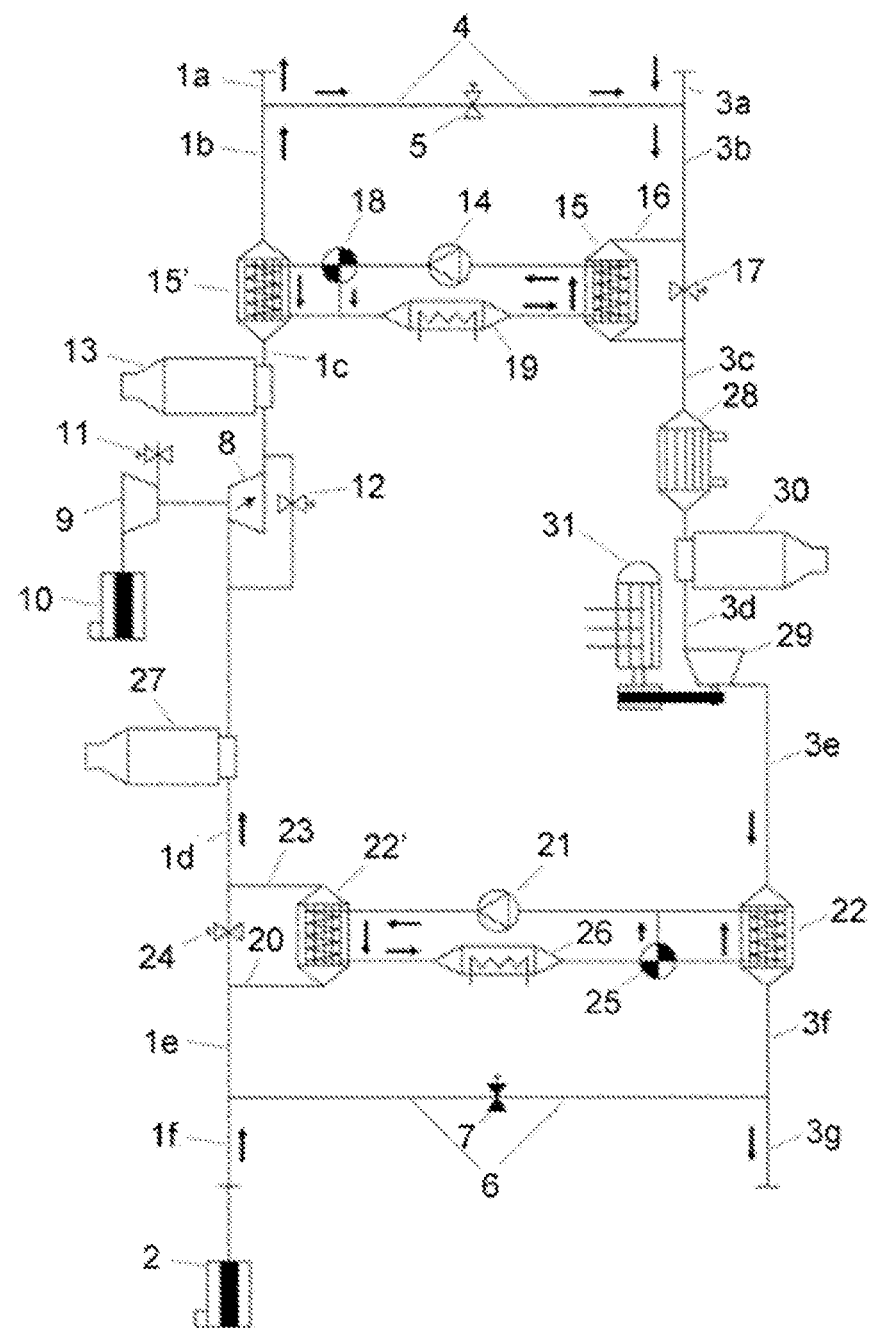
FIG. 1 shows a diagram of the device according to a first embodiment of the present invention, according to a first mode of operation.

A device according to a first preferred embodiment of the present invention will be described below according to two different modes of operation, making reference respectively to FIGS. 1 and 2. In FIG. 1, the device is used for simulating a higher altitude effect with respect to the geographic level at which the combustion engine is being subjected to testing, i.e., at a lower pressure. This is the case, for example, of the operation of the engine in high mountain areas.

Figure 2:
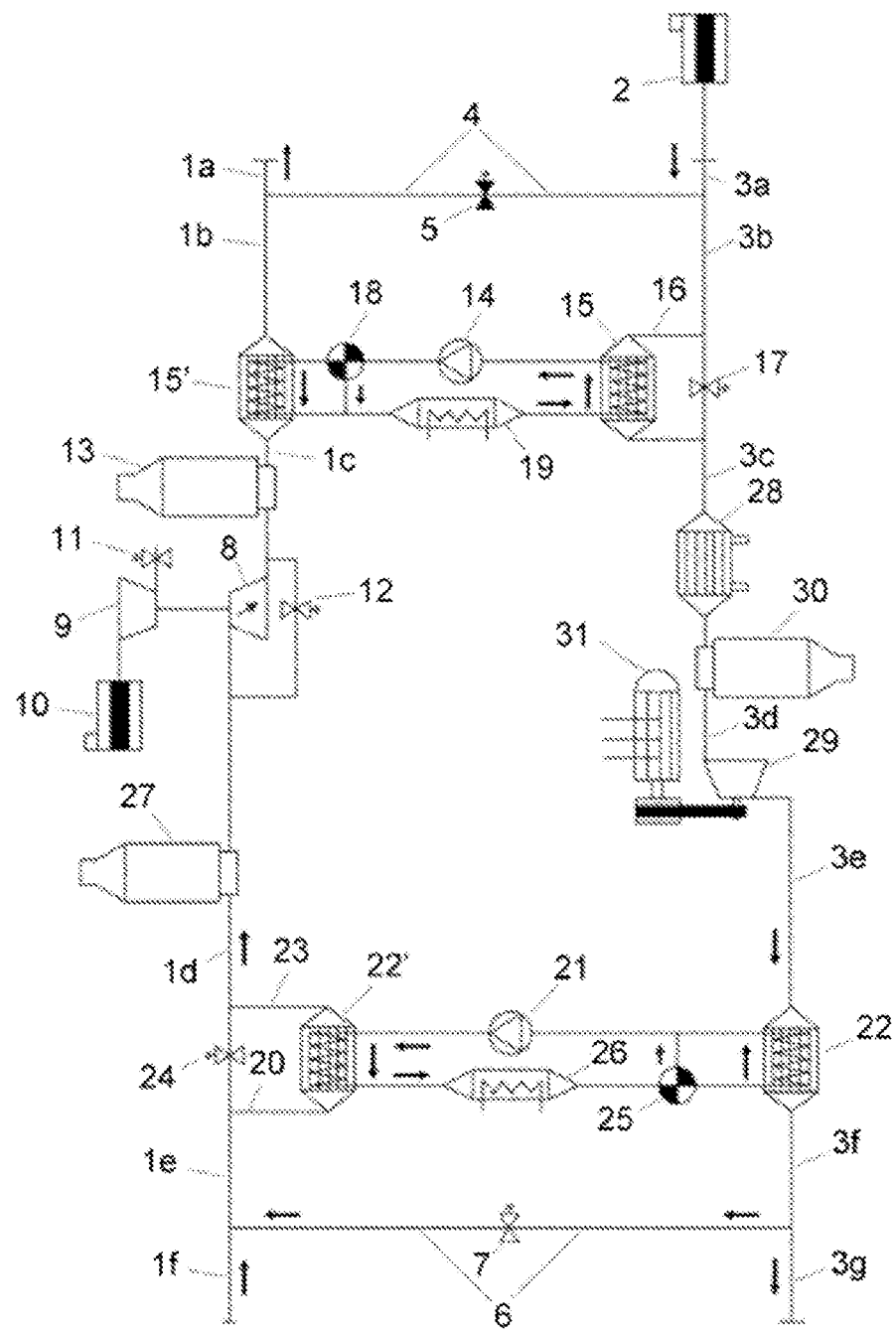
FIG. 2 shows a diagram of the device according to the first embodiment of the present invention, according to a second mode of operation.

In FIG. 2, the device for simulating a lower altitude effect is used with respect to the geographic level in which the combustion engine is being subjected to testing, i.e., at a higher pressure. This is the case, for example, of the operation of the engine at sea level (when the testing room is installed at higher levels) or even at a level lower than sea level, for example inside mines.

As seen in FIG. 1, the device comprises an inflow conduit (1) arranged for being connected at a first end (1a) to a combustion engine admission (not shown) to be subjected to testing. The inflow conduit (1) has a filter (2) at a second end (1f) through which air is drawn in from the outer atmosphere. The filter (2) allows preventing the entry of impurities in the device.

It also comprises an outflow conduit (3) arranged for being connected at a first end (3a) to the exhaust of the combustion engine and expelling exhaust gases into the atmosphere through a second end (3g).

As used throughout the present description, reference numbers 1 and 3 refer to the inflow conduit and the outflow conduit, respectively, as a whole. When each of these reference numbers is followed by a letter (1a, 1b, 1c . . . ; 3a, 3b, 3c . . . ), it refers to a segment of the corresponding conduit. This notation is used only for the sake of clarity, and the skilled person will understand that they are not necessarily different conduits but rather segments of one and the same conduit.

The inflow conduit (1) and the outflow conduit (3) are communicated by means of a first communication conduit (4) located close to the respective first ends (1a, 3a). The admission of the device is thereby in communication with the exhaust thereof.

The first communication conduit (4) furthermore has a valve (5) that allows opening or closing the communication between the inflow conduit (1) and the outflow conduit (3). In the case of FIG. 1, i.e., when the device works generating a pressure lower than atmospheric pressure, the valve (5) is always open. Therefore, there circulates through the first communication conduit (4) inflow air from the inflow conduit (1) towards the outflow conduit (3), both air and the difference between the air drawn in by the equipment through the filter (2) and that required by the engine. Therefore, there is a mixture of air and exhaust gas in the outflow conduit (3b).

According to the embodiment shown in FIG. 1, the device also has a second communication conduit (6) which communicates the inflow conduit (1) with the outflow conduit (3), arranged proximal to the second end (1f, 3g) thereof. Said second communication conduit (6) further comprises a valve (7) similar to the valve (5) mentioned above. When the device works according to the mode of operation shown in FIG. 1, i.e., at a working pressure lower than atmospheric pressure, the valve (7) located in the second communication conduit (6) is always closed, thereby cutting off the inflow conduit (1) and outflow conduit (3) from one another at this point.

The device further comprises at least one supercharging turbogenerator arranged in the inflow conduit (1), in turn comprising a turbine (8) coupled to a dissipation system for dissipating the energy generated in the expansion. The turbine (8) is preferably a turbine having a variable geometry (TGV), and more preferably of the radial inward-flow type.

According to the preferred embodiment of the present invention, the dissipation system for dissipating the energy generated in the expansion of the turbine consists of a radial centrifugal compressor (9). The compressor (9) is connected to a filter (10) through which it draws in air from the atmosphere and to at least one back pressure valve (11) through which the compressor (9) discharges the air drawn in into the atmosphere.

The device also comprises a bypass valve (12) located such that it diverts the air flow in the inflow conduit (1) that circulates towards the turbine (8). The bypass valve (12) and the turbine (8) can be regulated to obtain a desired mass flow rate and pressure value in the inflow conduit (1). Therefore, the inflow air in the inflow conduit (1c), located downstream from the turbine (8) and a condensate separator (13), is a mixture of air that expands in the turbine (8) and of air that is diverted through the bypass valve (12).

According to the diagram shown in FIG. 1, the device comprises two heat regenerators, one located close to the first end (1a, 3a) of the inflow conduit (1) and outflow conduit (3), and another one located close to the second end (1f, 3g) thereof. Each regenerator uses a heat transfer fluid which can be water or oil, for example, to exchange heat between two gas streams. Each heat regenerator includes two heat exchangers, one arranged in the inflow conduit and the other one in the outflow conduit, connected by the same heat transfer fluid circuit, such that is facilitated indirect heat exchange between the exhaust gases in the outflow conduit and the admission air in the inflow conduit.

When the equipment works at a pressure lower than atmospheric pressure, the first heat regenerator exchanges heat between the mixture of air and exhaust gases circulating through the outflow conduit (3b) and the air circulating through the inflow conduit (1c). In the first regenerator, the heat transfer fluid is driven by means of a pump (14). The heat transfer fluid takes up the heat in the exchanger (15) from the exhaust gas circulating through the conduit (16). The heat transfer fluid transmits that heat, in the exchanger (15'), to the air circulating through the inflow conduit (1c) such that the temperature of the air in the inflow conduit (1b) is greater than the temperature of the air in the inflow conduit (1c).

The temperature of the air in the inflow conduit (1b) is regulated as a result of a bypass valve (17). If the bypass valve (17) is closed, a greater passage of flow through the conduit (16) is allowed such that a greater increase in the temperature of the air in the inflow conduit (1b) is allowed. In contrast, if the bypass valve (17) is opened, a smaller flow in the conduit (16) is allowed such that the increase in temperature of the air in the conduit (1b) is lower.

If, in contrast, the temperature of the air in the inflow conduit (1b) is to be reduced below the temperature of the air in the inflow conduit (1c), the heat regenerator comprises to that end a three-way valve (18) located upstream from the heat exchanger (15') and an auxiliary heat exchanger (19), located between the three-way valve (18) and the heat exchanger (15). The auxiliary heat exchanger (19) is connected to a coolant fluid circuit (not shown) to which the heat transfer fluid will transmit the heat taken up by said fluid in the heat exchanger (15'), and in turn coming from the air circulating through the inflow conduit (1c). In this case in which the air in the inflow conduit (1b) is to be cooled with respect to the inflow conduit (1c), the bypass valve (17) will be completely open, and the three-way valve (18) will allow the passage towards the heat exchanger (15') and will close the path which, located before the heat exchanger (15'), diverts the fluid. In summary, with this first heat regenerator the temperature in the inflow conduit (1b) can be independent of the pressure and temperature in the inflow conduit (1c).

When the equipment works at a pressure lower than atmospheric pressure, the second heat regenerator exchanges heat between the mixture of air and exhaust gases circulating through the conduit (3e) and the inflow air circulating through the conduit (20). In the second regenerator, the heat transfer fluid is driven by means of a pump (21). The heat transfer fluid takes up the heat in the heat exchanger (22) from the exhaust gas circulating through the conduit (3e). The heat transfer fluid transmits that heat, in the heat exchanger (22'), to the inflow air circulating through the conduit (20), such that the temperature of the air in the conduit (23) is greater than the temperature of the inflow air in the conduit (20). The temperature of the inflow air in the conduit (1d) is regulated as a result of a bypass valve (24). If the bypass valve (24) is closed, a greater flow is allowed to pass through the conduit (20) thereby allowing an increase in the temperature of the air in the inflow conduit (1d). Conversely, if the bypass valve (24) is opened, the effect of the increase in temperature caused by the heat exchanger (22') is reduced.

If the temperature of the inflow air in the inflow conduit (1d) is to be reduced below the temperature of the air in the inflow conduit (1e), the second heat regenerator comprises to that end, as in the previous case, a three-way valve (25) located upstream from the heat exchanger (22) and an auxiliary heat exchanger (26), located between the heat exchanger (22') and the three-way valve (25). The auxiliary heat exchanger (26) is connected to a coolant fluid circuit (not shown) to which the heat transfer fluid will transmit the heat taken up by said fluid in the heat exchanger (22'), and in turn coming from the air circulating through the conduit (20). In this case, in which the air in the inflow conduit (1d) is to be cooled with respect to the air in the inflow conduit (1e), the position of the bypass valve (24) is regulated and the three-way valve (25) is closed to prevent the passage towards the heat exchanger (22) and to open the path which, located before the heat exchanger (22), diverts the fluid. In summary, with this second heat regenerator the temperature in the inflow conduit (1d) can be independent of the pressure and temperature in the testing area.

The device shown in FIG. 1 also comprises an ice and condensate separator (27) located immediately downstream from the inflow conduit (1d) and before the turbine (8).

Now with respect to the outflow conduit (3), immediately downstream from the first heat regenerator, the exhaust gases, diluted with inflow air, and partially cooled (by means of the first heat regenerator and the dilution), are cooled again in a heat exchanger (28) to a safe temperature for being introduced in a turbocompressor (29). The heat exchanger (28) can use any fluid suitable, such as tap water at room temperature, as a coolant fluid. After the heat exchanger (28), and before the turbocompressor (29), the exhaust gases are passed through a condensate separator (30).

The turbocompressor (29) is charged by at least one electric motor (31). The turbocompressor (29) draws in the cooled mixture of air and exhaust gases from the outflow conduit (3*d*) in order to extract it from the device. The electric motor (31) regulates the rotational speed of the turbocompressor (29) until a specific desired mass flow rate and pressure value in the air taken in are reached, regulating these conditions together with the turbine (8) and the bypass valve (12).

The mixture of air and exhaust gases drawn in by the turbocompressor (29) passes through the outflow conduit (3*e*), through the exchanger (22) of the second heat regenerator described above, to ultimately be discharged into the atmosphere through the outflow conduit (3*g*).

Now in reference to FIG. 2, the operation of a device according to the same embodiment shown in FIG. 1 is described, but in a excess pressure generation mode. In other words, in the mode of operation of FIG. 2 the device is simulating atmospheric conditions at an altitude level lower than that of the room in which the testing is being performed, i.e., at a higher pressure.

The main elements of the device are the same as those shown in FIG. 1, and therefore a detailed description thereof will not be given again. The elements that are the same in FIG. 2 with respect to FIG. 1 are indicated with the same reference numbers.

The main difference of the mode of operation shown in FIG. 2 with respect to the one shown in FIG. 1, and constituting a substantial advantage of the present invention with respect to the devices known in the prior art, is that installing the air filter (2) (which was previously connected at the second end of the inflow conduit (1*f*)), at the first end of the outflow conduit (3*a*) has been allowed. The admission of the internal combustion engine which is being subjected to testing is connected to the second end of the outflow conduit (3*g*), whereas the exhaust of the internal combustion engine is connected to the second end of the inflow conduit (1*f*).

Therefore, in this second mode of operation the function of the inflow and outflow conduits is inverted (conduit (1) now acts as an outflow conduit, whereas conduit (3) now acts as an inflow conduit). Therefore, instead of passing through the turbine (8) of the supercharging turbogenerator which decreases its pressure, the inflow air passes through the turbocompressor (29), thereby providing a desired pressure value to the inflow air which is greater than the atmospheric pressure value at the altitude level in which testing is being performed.

When the equipment works according to the present configuration, i.e., compressing the air drawn in, the valve (7) located in the second communication conduit (6) is always open. Therefore, air always circulates through the second communication conduit (6) from the conduit (3) towards the conduit (1); therefore, in the conduit (1) there is a mixture of air and exhaust gases.

Said mixture of air and exhaust gases is discharged into the atmosphere through the conduit (1*a*). The conduit (1) is also connected to the conduit (3) through the first communication conduit (4). When the equipment works according to the present configuration, i.e., compressing the air drawn in, the valve (5) located in the first communication conduit (4) is always closed, such that the conduits (1) and (3) are cut off from one another at that point.

Therefore, as can be seen based on FIGS. 1 and 2 discussed above, the device according to a first preferred embodiment of the present invention allows simulating atmospheric pressure conditions, both higher and lower, and temperature conditions, both higher and lower, than the atmosphere of the altitude level at which testing is performed. The adjustments that can be made to the pressure and temperature are independent from one another. Furthermore, the increase in the temperature of the inflow air is performed with minimal energy expenditure, since the heat from the exhaust gases of the internal combustion engine which is being subjected to testing is used. A simple change in the configuration of the device of the first embodiment of the invention allows easily changing the mode of operation, from simulating higher pressure to simulating lower pressure with respect to the pressure of the surrounding atmosphere.

Figure 3:
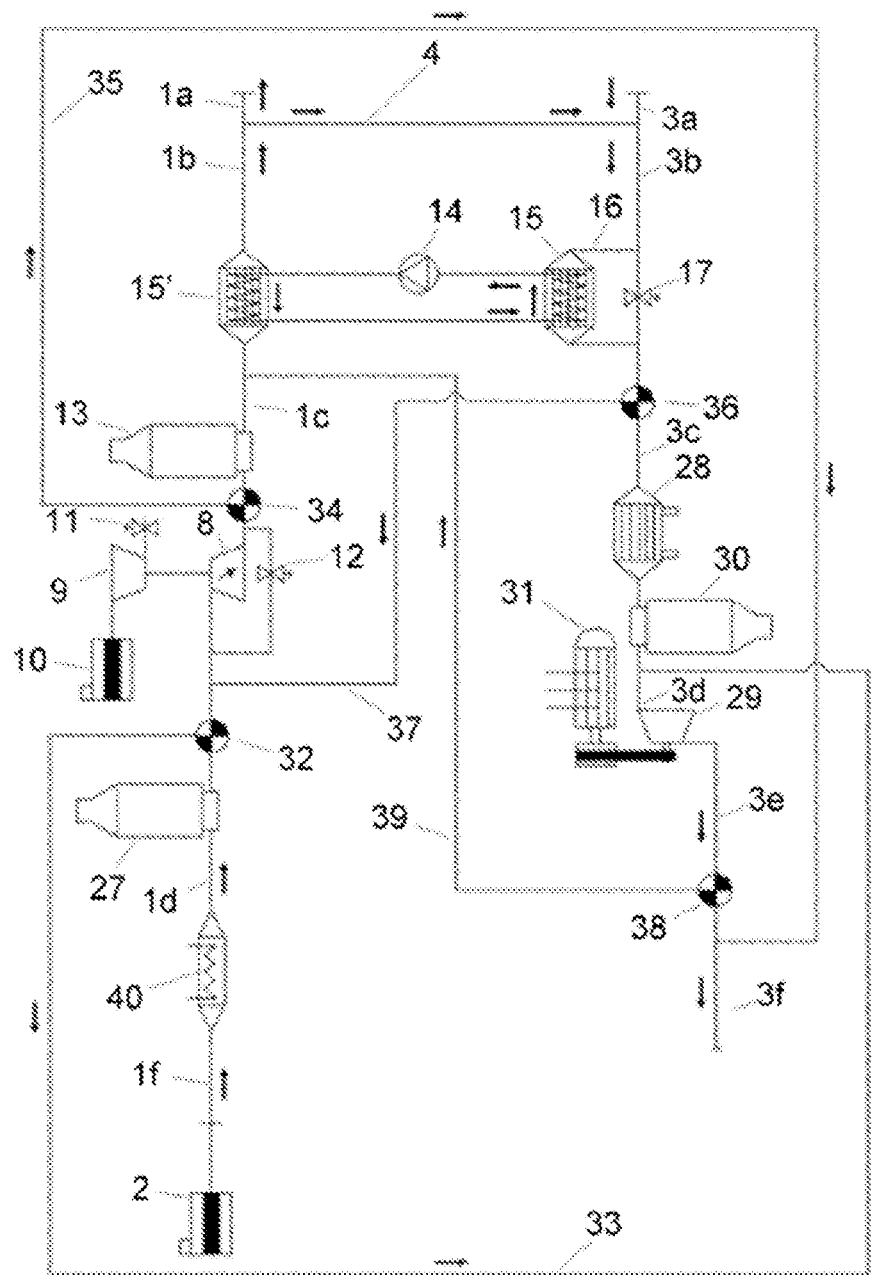
FIG. 3 shows a diagram of the device according to a second embodiment of the present invention.

Now in reference to FIG. 3, a second preferred embodiment of the device according to the present invention is shown. According to this second embodiment, the device can work with the capacity to simulate lower pressure or higher pressure with respect to the pressure of the surrounding atmosphere without needing to change the respective location of the filter (2) and of the internal combustion engine as was done by changing the mode of operation between the preceding FIGS. 1 and 2.

The elements in FIG. 3 that are the same as those shown in FIGS. 1 and 2 have the same reference numbers, and will not be described in further detail.

The device according to the second preferred embodiment of the invention further comprises an assembly of three-way valves that allow the use of the device in a mode for increasing or reducing the inflow air pressure with respect to atmospheric air. Specifically, the device comprises a first three-way valve (32) connecting the inflow conduit (1*d*), upstream from the supercharging turbogenerator, with the outflow conduit (3*d*), between the heat exchanger (28) and the turbocompressor (29). This connection is performed through a conduit (33).

A second three-way valve (34) connects the inflow conduit (1*c*), between the supercharging turbogenerator and the first heat regenerator, with the outflow conduit (3*f*) proximal to its second end. This connection is performed through a conduit (35).

A third three-way valve (36) connects the outflow conduit (3*c*), between the first heat regenerator and the heat exchanger (28), with the inflow conduit (1*d*), between the first three-way valve (32) and the supercharging turbogenerator. This connection is performed through a conduit (37).

Finally, a fourth three-way valve (38) connects the outflow conduit (3*e*), between the turbocompressor (29) and the point where a conduit (35) from the second three-way valve (34) flows out, and the inflow conduit (1*c*), between the second three-way valve (34) and the first heat regenerator. This connection is performed through a conduit (39).

Therefore, in the embodiment of FIG. 3, in order to work at a pressure lower than atmospheric pressure, the air is drawn in from the atmosphere through the air filter (2) and is conveyed through the inflow conduit (1) to the admission of the internal combustion engine which is being subjected to testing (not shown). To that end, the three-way valves (32) and (34) allow the passage of air drawn in through the inflow conduit, closing the passage of flow towards the conduits (33) and (35), respectively. The communication conduit (4) connects the inflow conduit (1*b*) with the outflow conduit (3*b*) in order to maintain the same pressure in both.

The exhaust conduit of the engine discharges the exhaust gases of the engine into the outflow conduit (3a). The exhaust gases and air drawn in from dilution (transferred through the communication conduit (4)) are mixed in the outflow conduit (3b). These gases are discharged into the atmosphere, making them reach the outflow conduit (3f), keeping the three-way valves (36) and (38) open in the direction of the flow of the outflow conduit (3) and closing the passage of flow towards the conduits (37) and (39), respectively.

In the opposite case, i.e., in the case of an operation of the device generating excess pressure, the air is drawn in through the air filter (2). In this case, the first three-way valve (32) is closed in the direction of entry into the turbine (8) and open for diverting the flow towards the conduit (33). The third three-way valve (36) is closed in the direction towards the conduit (3c) such that the flow from the conduit (33) is discharged into the conduit (3d) and does not go back; the flow towards the turbocompressor (29) being the only free path. At the outlet of the turbocompressor (29), the fourth three-way valve (38) is closed in the direction towards the conduit (3f), such that the air flow drawn in is diverted through the conduit (39), and is discharged into the conduit (1c). The second three-way valve (34) is closed preventing the transfer of flow from the turbine (8) towards the first heat regenerator. Therefore, the air drawn in from the conduit (39) is discharged into the entry of the first heat regenerator and does not go back; the flow towards the inflow conduit (1a) coupled to the admission of the engine being the only free path.

The exhaust gases of the engine are discharged into the outflow conduit (3a) flowing towards the third three-way valve (36). As indicated, this three-way valve (36) prevents the passage of flow towards the conduit (3c), diverting it through the conduit (37) towards the entry of the turbine (8). As indicated, the first three-way valve (32) is closed in the direction of entry into the turbine (8) and open so that the flow is diverted to the conduit (33). Therefore, the flow from the conduit (37) does not go back; the flow towards the turbine (8) and the bypass valve (12) being the only free path. When it reaches the second three-way valve (34), the flow is diverted towards the conduit (35), the passage towards the inflow conduit (1c) being closed. The fourth three-way valve (38) is closed in the direction towards the conduit (3e) such that the mixture of exhaust gases and air does not go back; the flow towards the atmosphere through the outflow conduit (3f) being the only free path.

The embodiment shown in FIG. 3 furthermore has several additional changes with respect to the embodiment shown in FIGS. 1 and 2. Firstly, between the inflow conduit (1), upstream from the first three-way valve (32), there is an additional heat exchanger (40) connected to a cooling circuit. This heat exchanger (40) allows reducing the temperature of the inflow air to a desired value.

Secondly, in the second embodiment shown in FIG. 3, only one heat regenerator is required, and furthermore said heat regenerator is simpler than those shown in FIGS. 1 and 2. In this case, the heat regenerator consists of the exchanger (15'), the exchanger (15), the pump (14) and the bypass valve (17). This heat regenerator is only used to heat in the heat exchanger (15') the air that is discharged into the conduit (1b), using to that end the energy of the dilution mixture of exhaust gases and air circulating through the heat exchanger (15).

Figure 4:
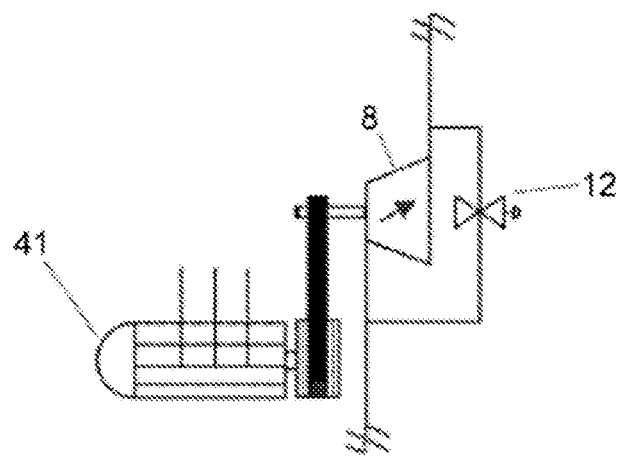
FIG. 4 shows a diagram of an alternative embodiment for dissipating the energy generated in the expansion of the turbine of the device of the present invention.

Now in reference to an additional embodiment shown in FIG. 4, it can be seen that the turbine (8) can also be coupled to an electric generator (41) which absorbs the energy obtained in the expansion in the turbine.

Figure 5:
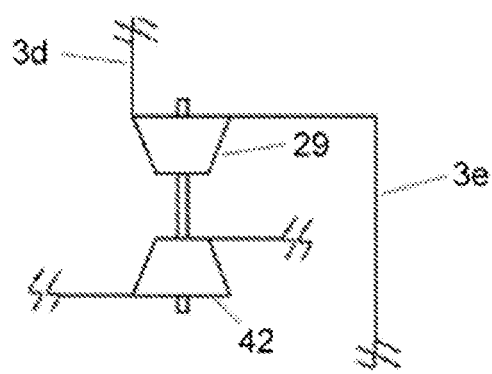
FIG. 5 shows a diagram of an alternative embodiment of the turbocompressor of the device of the present invention.

According to another preferred embodiment shown in FIG. 5, the turbocompressor (29) is driven by means of a turbine (42). The turbine (42) and turbocompressor (29) assembly coupled on the same shaft can be a supercharging turbogenerator. The turbine (42) is operated by means of a flow of gases generated to that end in a flow bench. In this embodiment of the present invention, the turbine (42) regulates the rotational speed of the turbocompressor (29) until a specific desired mass flow rate and pressure value is reached in the air taken in, regulating these conditions together with the turbine (8) and the bypass valve (12).

As can be inferred from the preceding description, the device according to the present invention has a series of advantages with respect to the prior art. For example, one advantage of the device of the present invention is that it has a reversible operation. In other words, the equipment disclosed in the preferred embodiments of the present invention allows the operation, with low energy expenditure, to simulate pressure conditions, both greater than and lower than atmospheric pressure. This ability is required for simulating the atmosphere at sea level in those engines in installations located at high geographical levels. It is also useful for simulating the working atmosphere characteristic of those engines operating in mines located at levels lower than sea level. Another additional advantage is that, as a result of including the bypass valve in the turbine having a variable geometry, there can be a greater mass flow rate at low altitudes.

The flexible design of the device according to the preferred embodiments of the present invention allows making the temperature conditions that can be generated in the inflow air independent from the pressure that can be demanded. On one hand, the temperature can be increased with respect to the temperature of the atmosphere of the site. To that end, at least one heat regenerator making use of the energy of the exhaust gases is used. On the other hand, the temperature can be reduced with respect to the temperature of the atmosphere of the site by means of combining a polytropic expansion process (with an isentropic yield between 40% and 80%) with a cooling process close to isobaric conditions.

The present invention also discloses a method for atmosphere conditioning for testing combustion engines, preferably making use of a device according to the present invention, comprising the steps of:
  subjecting inflow atmospheric air to a pressure variation step;
  subjecting inflow air to a temperature variation step;
  diverting inflow air towards the outlet to directly communicate exhaust gases with inflow air;
  introducing inflow air subjected to independent pressure and temperature variations in the admission of an engine to be subjected to testing;
  reducing the temperature of the exhaust gases to a safe temperature for the passage thereof through a turbocompressor; and
  expelling exhaust gases from the engine subjected to testing into the atmosphere.

The inflow air pressure variation step in the method of the preferred embodiment of the present invention is performed by means of the combined action of a turbocompressor, a turbine and a bypass valve regulating the amount of inflow air.

Alternative embodiments of the method of the present invention can include, for example, the incorporation of a second temperature variation step of the inflow air.

According to another alternative embodiment, at least one of the inflow air temperature variation steps consists of increasing the temperature thereof by means of indirect heat exchange with hot exhaust gases.

According to the present invention, the inflow air pressure variation step can comprise either reducing the inflow air pressure or increasing the inflow air pressure.

Furthermore, according to the present invention, the method can comprise either the step of increasing the pressure of the exhaust gases before expelling them into the atmosphere or the step of reducing the pressure of the exhaust gases before expelling them into the atmosphere.

Finally, the present invention also relates to the use of a device according to the present invention, as defined above in reference to FIGS. 1 to 5, for independently conditioning the pressure and temperature of the atmosphere while testing combustion engines.

Although the present invention has been described in reference to preferred embodiments thereof, the skilled person will understand that modifications and variations to the described embodiments can be applied without departing from the scope of the present invention. For example, the turbocompressor and the turbine could be coupled to other systems that provide or dissipate energy respectively, not necessarily limited to that described above herein.

Furthermore, although preferred embodiments of the device of the present invention comprising two heat regenerators to transmit heat from the exhaust gases to the inflow air have been described, it will be obvious for a skilled person that alternative embodiments of the device of the present invention can include a single heat regenerator or more than two heat regenerators.

The skilled person will also understand that although the present invention has been described in reference to testing internal combustion engines, the same can also be applied with minor modifications to the testing of other associated elements that may also have to work at different altitude levels (for example air filters, silencers, elements for cleaning exhaust gases (post-treatment), etc.).

According to the foregoing, the present invention allows simulating both excess pressure and low pressure conditions with respect to atmospheric pressure according to a reversible operation with the same equipment, without the need for major changes to configuration to change the mode of operation.

As a result of the bypass valve (12), in combination with the turbocompressor (29) and the turbine (8), the present invention allows regulating air pressure and flow.

The bypass valve (12) diverts the air flow in the inflow conduit (1) that circulates towards the turbine (8), which allows transferring a much greater mass flow rate, particularly at low altitudes. Therefore, the device circulates a higher flow so that in the event of fluctuation, the drawing in pressure does not change and the connection of the engine to the device does not affect the operation of the engine. In summary, the bypass valve (12) allows better simulating low altitude conditions and increases the equipment simulation range.

Furthermore, the possibility of the turbine (8) having variable geometry provides a considerable improvement as regards yield and flexibility, providing an energy-savings advantage to be taken into account.

The vacuum generating system is a turbocompressor (29) which in one of the embodiments is driven by an electric motor (31) or by a turbine (42) (the turbocompressor and turbine forming another turbogenerator), so the equipment is very compact.

In addition, the present invention has regenerators to heat the admission air by using the energy from the exhaust gases of the engine and to enable simulating high temperature conditions, so it prevents the use of electrical resistors and provides additional control over the temperature. Furthermore, it has a heat exchanger for cold (cold producing equipment) specifically integrated in each of the regenerators.

Therefore, the equipment allows precisely controlling the pressure and temperature of the air drawn in both in the admission and in the exhaust of the engine, and allows a wide simulation range.

All this gives it a technical advantage with respect to the prior art, particularly patent document ES2398095 A1 (also published as US 20130306159 A1) and patent document US2004186699, which, although it also allows simulation at altitudes lower than testing site, is less compact and both the elements and the method used for achieving it differ from what is disclosed herein.

The invention claimed is:

1. An atmosphere conditioning device for testing combustion engines, comprising the device:
   an inflow conduit arranged for being connected at a first end to a combustion engine admission to be subjected to testing and drawing in air from the outer atmosphere through a second end;
   an outflow conduit arranged for being connected at a first end to the exhaust of the combustion engine and expelling exhaust gases into the atmosphere through a second end;
   a first communication conduit which communicates the inflow conduit with the outflow conduit close to their respective first ends, such that the admission of the device is in communication with the exhaust thereof;
   a supercharging turbogenerator arranged in the inflow conduit, the turbogenerator comprising a turbine coupled to a dissipation system for dissipating the energy generated in the expansion;
   a first bypass valve which diverts the air flow in the inflow conduit that circulates towards the turbine, the first bypass valve and the turbine being able to be regulated to obtain desired pressure and air flow values in the inflow conduit;
   a first heat regenerator, consisting of respective first and second heat exchangers in the outflow conduit and in the inflow conduit connected by the same heat transfer fluid circuit, arranged between the supercharging turbogenerator and the first communication conduit, facilitating indirect heat exchange between the exhaust gases in the outflow conduit and the admission air in the inflow conduit;
   a second bypass valve in the outflow conduit together with the corresponding first heat exchanger of the first heat regenerator, regulating the amount of exhaust gases that actually participate in the heat exchange;
   a third heat exchanger in the outflow conduit downstream from the first heat regenerator to cool the exhaust gases to a safe temperature; and
   a turbocompressor downstream from the third heat exchanger, charged by turbocompressor charging means, to regulate, together with the turbine and the first bypass valve, the decrease in admission air pressure and admission air flow;

thereby, connecting the admission of the engine to the second end of the outflow conduit and the exhaust of the engine to the second end of the inflow conduit, the operation of the device is inverted, the inflow conduit becoming the outflow conduit and vice versa, such that the turbocompressor, the turbine and the first bypass valve together regulate the increase in admission air pressure.

2. The device according to claim 1, characterized in that it further comprises a pump driving the heat transfer fluid between the first and second heat exchangers of the first heat regenerator.

3. The device according to claim 2, characterized in that the heat transfer fluid circuit in the first heat regenerator further comprises:
a three-way valve located upstream from the second heat exchanger located in the inflow conduit; and
an auxiliary heat exchanger connected to a coolant fluid circuit;
such that the auxiliary exchanger can indirectly cool the inflow air in the inflow conduit.

4. The device according to claim 1, characterized in that it further comprises a second heat regenerator, consisting of respective fourth and fifth heat exchangers in the outflow conduit and in the inflow conduit connected by the same heat transfer fluid circuit, arranged in the proximity of the respective seconds ends of the inflow conduit and the outflow conduit, facilitating an additional indirect heat exchange between the exhaust gases in the outflow conduit and the admission air in the inflow conduit.

5. The device according to claim 4, characterized in that it further comprises a third bypass valve in the inflow conduit together with the corresponding fifth heat exchanger of the second heat regenerator, regulating the amount of inflow gases that actually participate in the heat exchange.

6. The device according to claim 4, characterized in that it further comprises a pump driving the heat transfer fluid between the fourth and fifth heat exchangers of the second heat regenerator.

7. The device according to claim 4, characterized in that the heat transfer fluid circuit in the second heat regenerator further comprises:
a three-way valve located upstream from the fourth heat exchanger of the outflow conduit; and
an auxiliary heat exchanger connected to a coolant fluid circuit;
such that the auxiliary exchanger can indirectly cool the inflow air in the inflow conduit.

8. The device according to claim 1, characterized in that the first communication conduit further comprises a valve that allows opening or closing said communication between the inflow conduit and the outflow conduit.

9. The device according to claim 8, characterized in that it further comprises a second communication conduit, arranged in the proximity of the respective seconds ends of the inflow conduit and the outflow conduit, which communicates the inflow conduit with the outflow conduit.

10. The device according to claim 9, characterized in that the second communication conduit further comprises a valve that allows opening or closing said communication between the inflow conduit and the outflow conduit.

11. The device according to claim 1, characterized in that the dissipation system for dissipating the energy generated in the expansion in the turbine consists of a radial centrifugal compressor which is connected to a filter through which it draws in air from the atmosphere and to a back pressure valve through which it discharges the air transferred to the atmosphere.

12. The device according to claim 1, characterized in that the dissipation system for dissipating the energy generated in the expansion in the turbine consists of an electric generator.

13. The device according to claim 1, characterized in that the turbine is a turbine having a variable geometry.

14. The device according to claim 13, characterized in that the turbine having a variable geometry is a radial inward-flow type turbine.

15. The device according to claim 1, characterized in that the turbocompressor charging means are selected from an electric motor and a turbine.

16. The device according to claim 1, characterized in that it further comprises a filter at the end of the device through which air is drawn in from the outer atmosphere to prevent the entry of impurities in the device.

17. A method for using the device of claim 1 to independently condition the pressure and temperature of the atmosphere while testing combustion engines.

18. The device according to claim 1, characterized in that it further comprises at least one condensate separator.

19. An atmosphere conditioning device for testing combustion engines, comprising:
an inflow conduit arranged for being connected at a first end to a combustion engine admission to be subjected to testing and drawing in air from the outer atmosphere through a second end;
an outflow conduit arranged for being connected at a first end to the exhaust of the combustion engine and expelling exhaust gases into the atmosphere through a second end;
a first communication conduit which communicates the inflow conduit with the outflow conduit close to their respective first ends, such that the admission of the device is in communication with the exhaust thereof;
a supercharging turbogenerator arranged in the inflow conduit, the turbogenerator comprising a turbine coupled to a dissipation system for dissipating the energy generated in the expansion;
a first bypass valve which diverts the air flow in the inflow conduit that circulates towards the turbine, the first bypass valve and the turbine being able to be regulated to obtain desired pressure and air flow values in the inflow conduit;
a first heat regenerator, consisting of respective first and second heat exchangers in the outflow conduit and in the inflow conduit connected by the same heat transfer fluid circuit, arranged between the supercharging turbogenerator and the first communication conduit, facilitating indirect heat exchange between the exhaust gases in the outflow conduit and the admission air in the inflow conduit;
a second bypass valve in the outflow conduit together with the corresponding first heat exchanger of the first heat regenerator, regulating the amount of exhaust gases that actually participate in the heat exchange;
a third heat exchanger in the outflow conduit downstream from the first heat regenerator to cool the exhaust gases to a safe temperature;
a turbocompressor downstream from the third heat exchanger, charged by turbocompressor charging means, to regulate, together with the turbine and the first bypass valve, the decrease in admission air pressure and admission air flow;
- a first three-way valve connecting the inflow conduit, upstream from the supercharging turbogenerator, with the outflow conduit, between the third heat exchanger and the turbocompressor;
- a second three-way valve connecting the inflow conduit, between the supercharging turbogenerator and the first heat regenerator, with the outflow conduit proximal to the second end thereof;
- a third three-way valve connecting the outflow conduit, between the first heat regenerator and the third heat exchanger, with the inflow conduit, between the first three-way valve and the supercharging turbogenerator; and
- a fourth three-way valve connecting the outflow conduit, between the turbocompressor and the point where a conduit from the second three-way valve flows out, and the inflow conduit, between the second three-way valve and the first heat regenerator;
- such that the configuration of the assembly of three-way valves allows the use of the device in a mode for increasing or reducing the inflow air pressure with respect to atmospheric air.

20. The device according to claim 19, characterized in that it further comprises an additional sixth heat exchanger in the inflow conduit, upstream from the first three-way valve, to reduce the temperature of the inflow air.

21. The device according to claim 19, characterized in that it further comprises at least one condensate separator.

22. A method for using the device of claim 19 to independently condition the pressure and temperature of the atmosphere while testing combustion engines.

23. A method for atmosphere conditioning for testing combustion engines by means of an atmosphere conditioning device, comprising the steps of:
- subjecting inflow atmospheric air to a pressure variation step;
- subjecting inflow air to a first temperature variation step;
- diverting inflow air towards the outlet to directly communicate exhaust gases with inflow air;
- introducing inflow air subjected to independent pressure and temperature variations in the admission of an engine to be subjected to testing;
- reducing the temperature of the exhaust gases to a safe temperature for the passage thereof through a turbocompressor; and
- expelling exhaust gases from the engine subjected to testing into the atmosphere;
- wherein the inflow air pressure variation step is performed by means of the combined action of a turbocompressor, a turbine and a bypass valve regulating the amount of inflow air.

24. The method according to claim 23, further including a second inflow air temperature variation step.

25. The method according to claim 24, wherein at least one of either the first inflow air temperature variation or the second inflow air temperature variation step consists of increasing the temperature thereof by means of indirect heat exchange with hot exhaust gases.

26. The method according to claim 23, characterized in that the inflow air pressure variation step comprises reducing the inflow air pressure.

27. The method according to claim 23, characterized in that the inflow air pressure variation step comprises increasing the inflow air pressure.

* * * * *